UNITED STATES PATENT OFFICE.

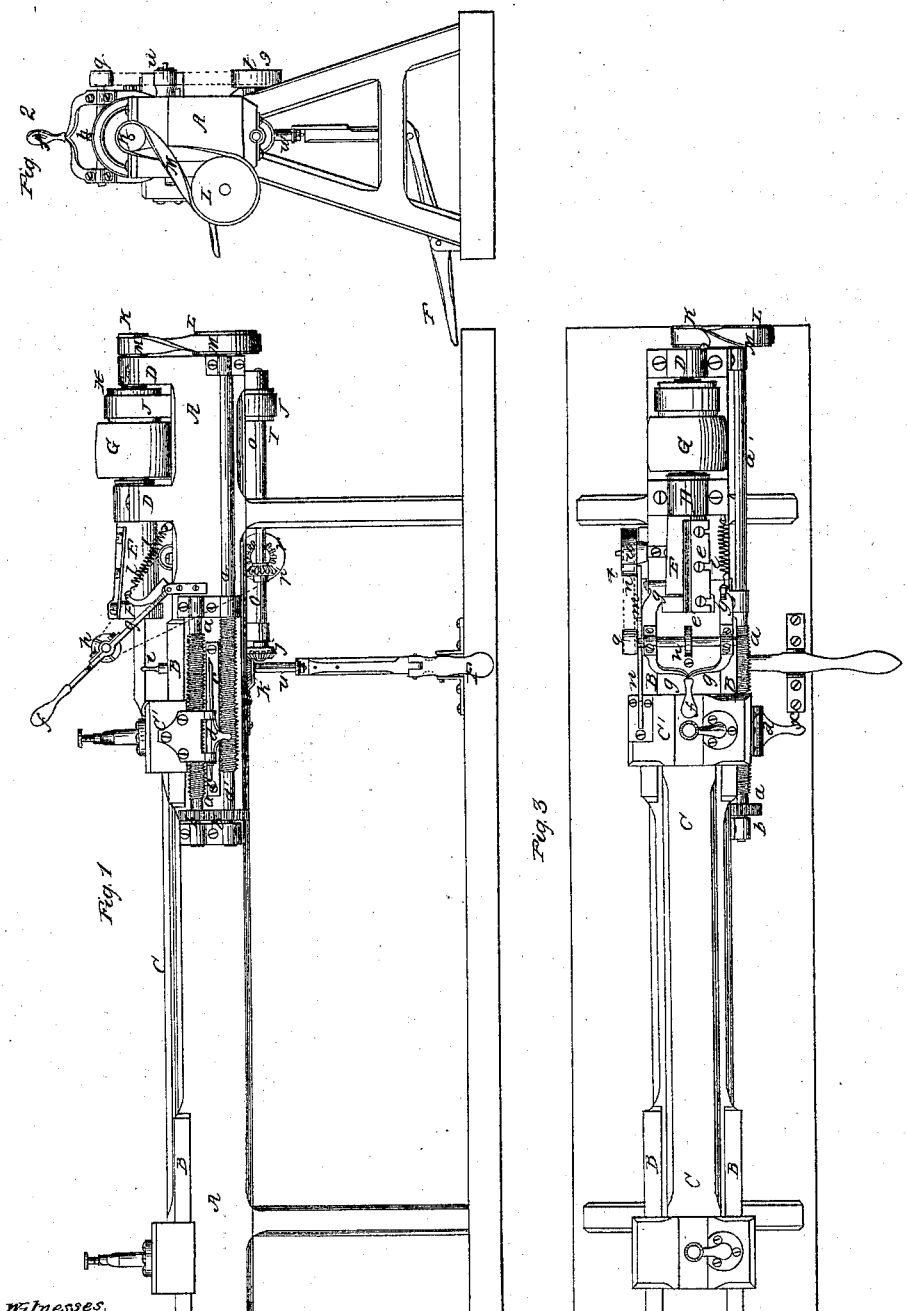

JAMES M. JAY, OF CANTON, OHIO, ASSIGNOR TO W. H. ALEXANDER & CO.

IMPROVEMENT IN MACHINES FOR MAKING THE SPINDLES OF WAGON-AXLES.

Specification forming part of Letters Patent No. 47,769, dated May 16, 1865.

*To all whom it may concern:*

Be it known that I, JAMES M. JAY, of Canton, in the county of Stark and State of Ohio, have invented certain new and useful Improvements in a Machine for Cutting the Spindles or Journals upon Wagon or Carriage Axles; and I do hereby declare that the following is a full, clear, and exact description of the same, reference being had to the accompanying drawings, making a part of this specification, in which—

Figure 1 represents a side view of the machine. Fig. 2 represents a view from one of its ends, and Fig. 3 represents a top plan.

Similar letters of reference where they occur in the several figures denote like parts in all the drawings.

My invention relates to an organized machine, wherein the journals or spindles, the gain for the skein, and the linchpin-hole on a wagon or carriage axle are all made in a series of sequent and automatic movements, as will be hereinafter explained.

To enable those skilled in the art to make and use my invention, I will proceed to describe the same with reference to the drawings.

A represents a bench or frame on which ways B are arranged for a carriage, C, to be moved upon and be guided by in its movement. The stick or piece of timber from or on which the journal or spindle is to be formed is clamped to the carriage C, and the head-block C' of the carriage may also be the gage for defining the length of the spindle or journal to be cut. On the side of the bench are two parallel screw-rods, $a\ a'$, with spurr-gears $b\ b'$ thereon that gear into each other, and between these screw-rods and slightly projecting from the frame there is a switch, $c$, for shifting and controlling a hinged segment of a nut or burr, $d$, that is fastened to the carriage C, and which, when working in or against one or the other of the screw-rods, feeds the carriage and piece from which the axle is to be made, forward and back, as the case may be, to be subjected to the cutting and boring instruments, as will be hereinafter explained.

On a shaft or spindle, suitably supported in bearings D D on the main frame or bench, there is a revolving hollow cutter-head, E, furnished with a cutter, $e\ e'$, by which the end of the stick that is carried into said cutter-head is reduced to a conical or tapering form—such as is usually given to the journals of carriage-axles—leaving a square shoulder for the hub of the wheel to abut against.

When the journal or spindle is cut upon the stick or piece of timber and the carriage is about to feed back by a change of the sectional nut or burr upon the screw-shafts, the operator seizes the handle $f$, which is attached to a hinged yoke or frame, $g$, and brings it down toward the journal or spindle just cut. In this frame there is hung a revolving-burr or cutter, $h$, driven by a belt, as shown in red in the drawings, which, by being brought against the journal or spindle, cuts a gain in it for the reception of the skeins that are usually applied to wagon-axle journals made from wood. When the gain is finished, the operator presses upon a foot-lever, F, which throws up a boring-tool, $i$, that is revolved by suitable bevel-gears $j\ k$, underneath the bench or table, and the linchpin-hole is cut or bored in the end of the journal. When the handle $f$ is released, a spring, $l$, which had been expanded by bringing down the gain-cutter to its work recoils and raises up the yoke or frame out of the way until the next succeeding operation is to be gone through with. The extent to which the gain-cutter can be brought down to its work is defined and regulated by a pin or stud, $m$, that comes against a gage or pattern, $n$, attached to the head-block $c'$, and this defines the depth and taper of the gain that is cut in the journal.

The shaft on which the cutter-head E is placed may be revolved by a belt from any first-moving power, passing over and around the pulley G thereon. On this same shaft is a pulley, H, around which, and around a pulley, I, on a shaft, $o$, underneath the bench, passes an endless belt, J, which drives said shaft $o$. On the shaft $o$ are two bevel-pinions, $p\ j$, the one, $p$, gearing with a bevel-wheel, $r$, on a shaft, $s$, that carries the pulley $t$, from which pulley $t$, through an endless belt, as shown in red, and passing around the pulley $q$ and an intermediate pulley, $u$, to keep the belt taut, the gain-cutter $h$ is driven. The other bevel-pinion, $j$, on the shaft $o$, gears into a similar pinion, $k$, on the boring-tool shaft $w$, and thus drives said boring-tool $i$. The shaft $w$ has a long slot in it, and its pinion $k$ has a "feather" upon it, which fits into said slot, so that the boring-tool shaft $w$ may be run up and down, but always remain in gear with its pinion, so as to be turned by it when necessary.

At the end of the shaft that carries the cutter-head there is a pulley, K, around which and around a pulley, L, upon the screw-shaft $a'$, there is passed a twisted belt, M, that gives motion to the shaft $a'$, and this shaft, through the gears $b'$ $b$, gives motion to the screw-shaft $a$. I have thus shown and described how all the movable parts may be driven, but it is obvious that other equally well-known mechanism for driving may be used, and I do not therefore confine my invention to these particular mechanical arrangements.

The mechanism for feeding the carriage with the stick upon it to the journal-cutter and then back again is mainly automatic in its operation, though it requires a slight degree of aid from the operator, but may be purely automatic, if desired—as, for instance, when the stick is being fed up to the journal-cutter, the sectional nut $d$ is in contact with the thread of the screw-shaft $a$, and is held up in contact with it by the switch $c$; but when the nut $d$ comes to the end of the switch $c$ there is nothing to hold it up and it immediately falls upon the lower screw-shaft, $a'$, and, having the same kind of sectional threads on its under side, it immediately gears with the screw-shaft $a'$, and is by it carried back. Now, when the nut $d$ reaches the rear end of the switch $c$, the operator places his hand upon the lever $x$ and raises the nut $d$ until it again gears with the upper screw-shaft, $a$, and is held by the switch, when he may release it and the operation goes on automatically until the nut is again to be raised up to start the stick forward; but this intervening of the operator's aid is advantageous, as the feed stops when the nut runs back to its full extent on the shaft $a'$, and during that stop, and before the feed is again started with a new stick or a new journal to cut, the linchpin-hole is bored out.

By means of the tapering form of the revolving cutter-head E and its cutters $e$ $e'$, I cut the spindle and shoulder both as the stick is fed up, finishing it, as it were, by one operation, the cutter $e$ forming the spindle portion, and that $e'$ forming the shoulder.

Having thus fully described the nature, object, and purpose of my invention, what I claim therein as new, and desire to secure by Letters Patent, is—

1. A machine for turning the journal or spindle, for cutting the gain therein, and for boring the linchpin-hole of wooden axles, the same being combined and arranged to operate in the manner and for the purpose substantially as set forth.

2. In a machine for cutting journals or spindles on axles, the revolving tapering cutter-head, with its cutters $e$ $e'$, as and for the purpose described.

JAMES M. JAY.

Witnesses:
W. W. CLARK,
H. D. ALEXANDER.